United States Patent [19]

Gablin et al.

[11] 4,196,169
[45] Apr. 1, 1980

[54] SYSTEM FOR DISPOSING OF RADIOACTIVE WASTE

[75] Inventors: Kenneth A. Gablin, Burton; Larry J. Hansen, Tacoma, both of Wash.

[73] Assignee: Nuclear Engineering Company, Inc., Louisville, Ky.

[21] Appl. No.: 724,281

[22] Filed: Sep. 20, 1976

Related U.S. Application Data

[60] Continuation of Ser. No. 483,785, Jun. 27, 1974, Pat. No. 4,056,362, which is a division of Ser. No. 220,214, Jan. 24, 1972, abandoned.

[51] Int. Cl.² .................... B01J 1/00; G21F 9/00
[52] U.S. Cl. .................... 422/159; 422/225; 422/119; 422/62; 23/230 A; 252/301.1 W
[58] Field of Search .............. 23/285, 260, 253 A, 23/230 A; 252/301.1 WP; 176/37, 39; 137/566, 567, 88; 418/48; 159/DIG. 12

[56] References Cited

U.S. PATENT DOCUMENTS

| | | | |
|---|---|---|---|
| 2,636,834 | 4/1953 | Myers | 418/48 X |
| 2,879,920 | 3/1959 | Davis | 418/48 X |
| 3,142,648 | 7/1964 | Lefillatre et al. | 252/301.1 W |
| 3,361,649 | 1/1968 | Karter | 252/301.1 W |
| 3,705,598 | 12/1972 | Ray | 137/567 X |
| 3,883,441 | 5/1975 | Murphy et al. | 252/301.1 W |

*Primary Examiner*—Morris O. Wolk
*Assistant Examiner*—Michael S. Marcus
*Attorney, Agent, or Firm*—Fleit & Jacobson

[57] ABSTRACT

A system for disposing of radioactive mixed liquid and particulate waste material from nuclear reactors by solidifying the liquid components into a free standing hardened mass with a syrup of partially polymerized particles of urea formaldehyde in water and a liquid curing agent.

39 Claims, 15 Drawing Figures

SYSTEM FOR DISPOSING OF RADIOACTIVE WASTE

This application is a continuation of application Ser. No. 483,785, filed June 27, 1974, now U.S. Pat. No. 4,056,362 issued Nov. 1, 1977, said application Ser. No. 483,785 being a division of application Ser. No. 220,214, filed Jan. 24, 1972, now abandoned.

BACKGROUND OF THE INVENTION:

This invention relates to a system for disposing of radioactive waste, and more particularly to an apparatus for solidifying radioactive waste liquids into a hardened mass suitable for disposal by burying.

Conventionally, liquid radioactive wastes, such as the liquid waste materials from a nuclear reactor, are disposed of by burying them in the earth or at sea. To prevent contamination of the surrounding environment after burial, the liquid materials, often mixed with solid radioactive waste materials, are usually solidified in some manner so they will remain where buried and will not leak or shed the radioactive materials.

Various attempts have been made to obtain solidification of these materials in a commercially acceptable manner. However, a number of problems are encountered and none of the prior systems are completely satisfactory. Solid radioactive wastes have been fixed in glass, bitumen, asphalt and similar materials. Efforts have been made to solidify aqueous slurries and solutions with such materials as emulsified asphalt, polyester and polyethylene. The latter have not proved to be practicable and almost all of the encapsulation of liquid radioactive waste materials has been accomplished by mixing it with Portland cement and allowing the resulting concrete-like mass to harden.

Many hitherto unsolved problems arise from the use of Portland cement to solidify the radioactive waste liquids. In the first place, the physical attributes of a solidified mass of concrete are jeopardized when variables are introduced such as a high range of pH values, many types of salt concentrations, and difficult materials, such as resin beads, in which the smooth surface areas differ greatly from the rough edges of the sand normally used. Concrete is a mixture of Portland cement, sand, aggregate (normally washed gravel), and water. The lack of the aggregate portion of the mixture results in mortar rather than concrete. If the proportion of water is too large, the resultant mortar is weak and crumbly.

Other problems occur when such mortar is placed in a sealed container, as is often the case in connection with solidified waste burial. Excess water that does not become part of the hydration of the Portland cement is left as standing or free water, which easily may contain radioactivity in a nonsolidified form. This free water also acts as a corrosive agent on the metal drum thereby increasing the chance of leaks.

Another disadvantage of Portland cement arises from its high specific gravity and the normal tendency for the particles of Portland cement to sink through the water to the bottom of the container and provide non-uniform distribution in the mixture. Even though the mixing is done correctly, and the wide range of pH values is compensated for in some manner so the cement will set, the solidification of the mass requires an inordinate time before it can be transported and buried. The liquid radioactive waste disposal system of the present invention overcomes most of the disadvantages of the previous systems, and makes possible a more effective way of solidifying and disposing of liquid and solid radioactive waste materials than has heretofore been available. To this end, the present system utilizes a setting agent capable of solidifying large quantities of water (the liquid most often encountered in radioactive waste disposal problems) and holding this water and other radioactive waste materials in a condition particularly suited for transportation and burial.

The described setting agent is a water extendable polymer consisting of an aqueous suspension or syrup of urea formaldehyde, usually in partially polymerized form. This material is very "forgiving" in the critical areas of surface tension and pH, and can be used in many proportions to form solids of various strengths. The agent is capable of taking up comparatively large volumes of water as the mass solidifies. Control over the rate of solidification is easily obtained by varying the amount of curing agent used, and the curing agent is a low cost commercially available reducing agent. Increasing the concentration of the curing agent shortens the solidification time as well as the time necessary to obtain the full potential strength of the mass. Raising the temperature of the mass also speeds up the solidification action.

The present system includes a plurality of positive displacement pumps whose output is proportional to their speed of operation, manifolding and valve systems for effecting desired mixtures and proportions, mixers for achieving and maintaining desired interdispersion of the materials, liquid presence and radioactivity sensors, and controls making it possible to operate the entire system from remote locations. The construction of the various elements of the system affords numerous safeguards and safety interlocks against accidental spilling or other escape of radioactive materials and for reducing adverse consequences from any such accidental spills.

The proportioning aspects of the system make it possible to provide a resulting solidified mass which meets LSA (Low Specific Activity) Standards imposed in connection with transportation and handling of radioactive materials. With the levels of radioactivity encountered in nuclear reactor waste materials, it is usually necessary to provide shielding during transportation and handling. This shielding is usually lead, often in the form of lead casks, and of course is extremely heavy. Since the cost of transportation of radioactive waste is more significant than either the cost of solidification or burial costs, any reduction in the amount of shielding required for a particular quantity of radioactive waste material represents a real saving. The present system makes it possible to control the LSA levels in such manner as to provide a reduction in the amount of transport shielding required, resulting in significant monetary savings as well as reducing the risk of radioactive contamination in the event of an accident. The system also provides a mode in which solid materials having a higher radioactivity level may be concentrated in the central area of the solidified mass, so the surrounding, lower radioactivity portions of the mass in themselves act as a shield.

It is therefore a principal object of the present invention to provide an apparatus capable of solidifying liquid radioactive waste into a free standing hardened mass suitable for disposal by burial in the earth or at sea.

Another object of the invention is to provide an apparatus of the character described which is capable of controlling the physical attributes of the resulting solidified mass, and which is especially adapted for inclusion in a surrounding container.

A further object of the present invention is to provide an apparatus of the character described which is capable of controlling the average specific radioactivity throughout the solidified mass, and in which the overall LSA count can be held within prescribed limits.

Another object of the invention is to provide an apparatus of the character set forth which is capable of diverting relatively high radioactivity waste material to the central area of the resulting solidified mass, whereby the surrounding lower radioactivity portions may act as a shield.

A still further object of the present invention is to provide an apparatus of the character described which is capable of producing a solidified, hardened mass of liquid radioactive waste of a desired LSA count.

Another object of the invention is to provide an apparatus of the character set forth which is capable of intermixing liquid and non-liquid radioactive waste materials with a setting agent in liquid form thereafter mixing in and a curing agent in liquid form, with the mixing of the setting agent and curing agent taking place only upon entry of the liquified mixture into a receiving tank.

Another object of the present invention is to provide the described apparatus and wherein the positive displacement pumps are capable of handling a wide range and variety of liquid, solid and slurrylike radioactive waste materials.

Yet another object of the invention is to provide a system of the character described in which first contact of the urea formaldehyde setting agent with the curing agent takes place immediately prior to introduction of the mixture into a receiving and solidifying tank, and the system is adapted for flushing with water at the end of the filling cycle.

A further object of the invention is to provide an apparatus of the character described which is particularly adapted for operation from remote positions and includes positive safeguards against accidental spills and deleterious consequences of escaping radioactive waste material.

Other objects and features of advantage will become apparent as the specification and claims continue.

Figure 1:
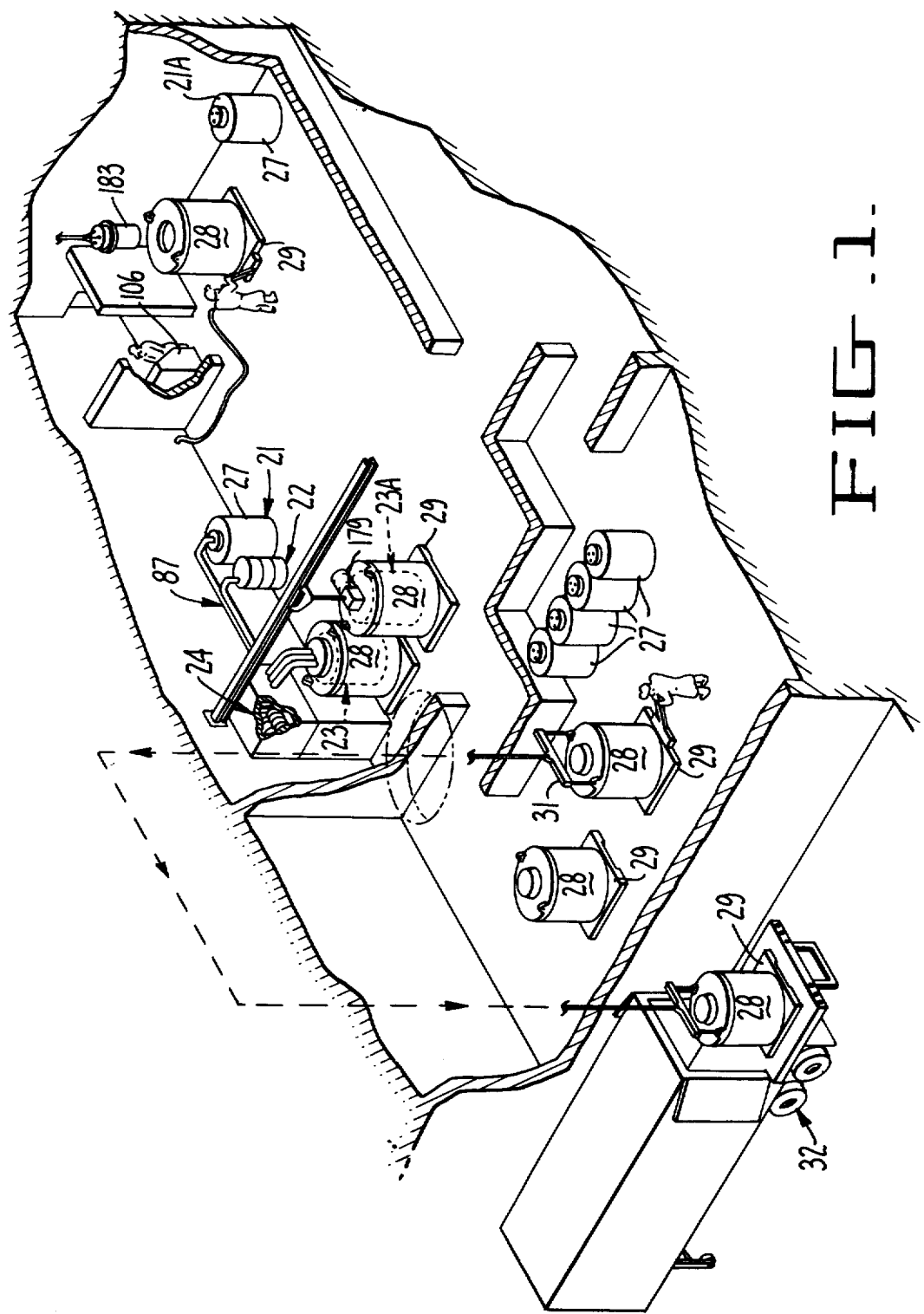
FIG. 1 is a perspective view of a system for disposing of waste liquids containing radioactive materials made in accordance with the present invention, with portions of the surrounding building being broken away and shown in sections for clarity.
Figure 2:
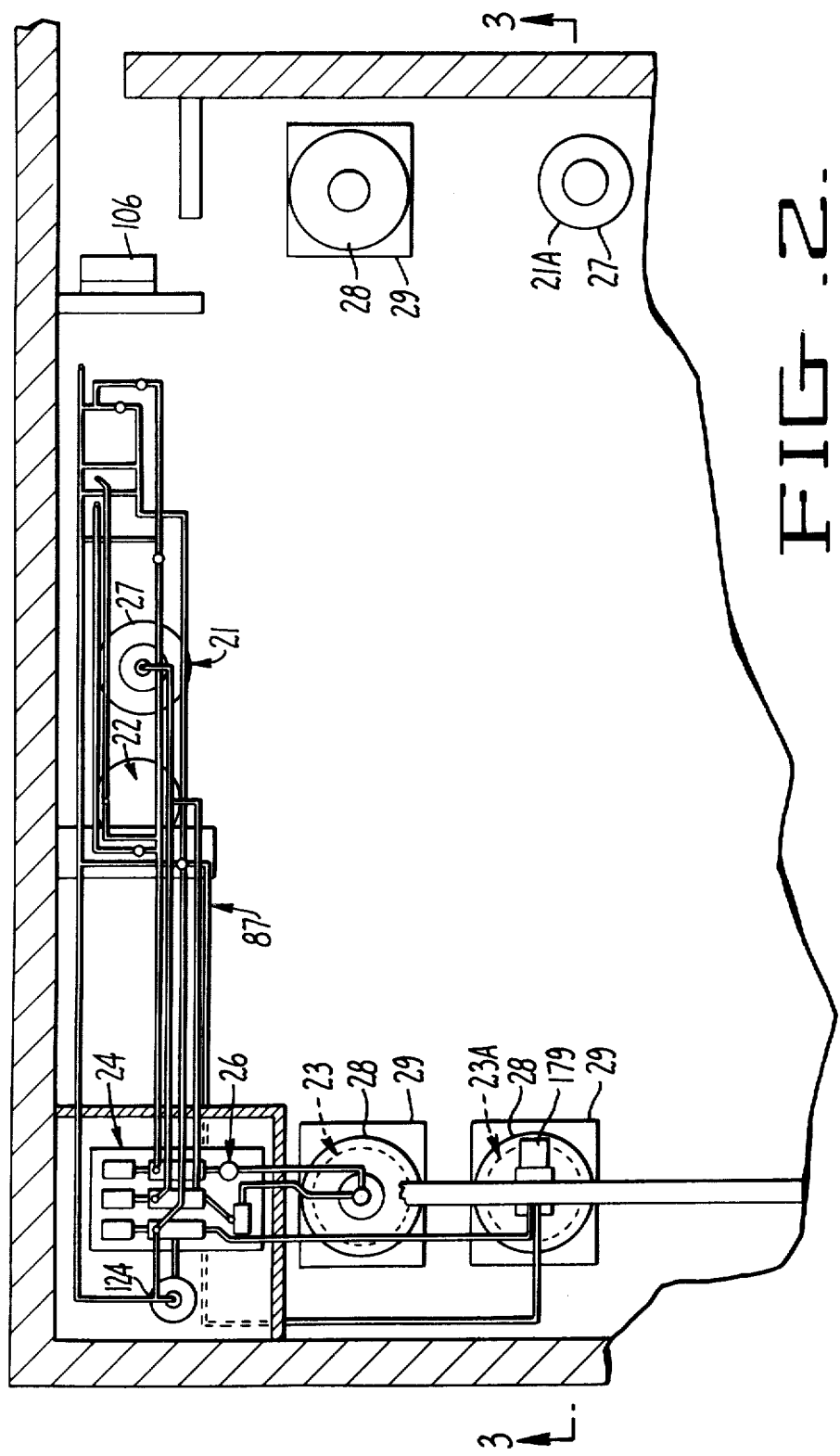
FIG. 2 is a partial plan view, on an enlarged scale, of the system of FIG. 1.
Figure 3:
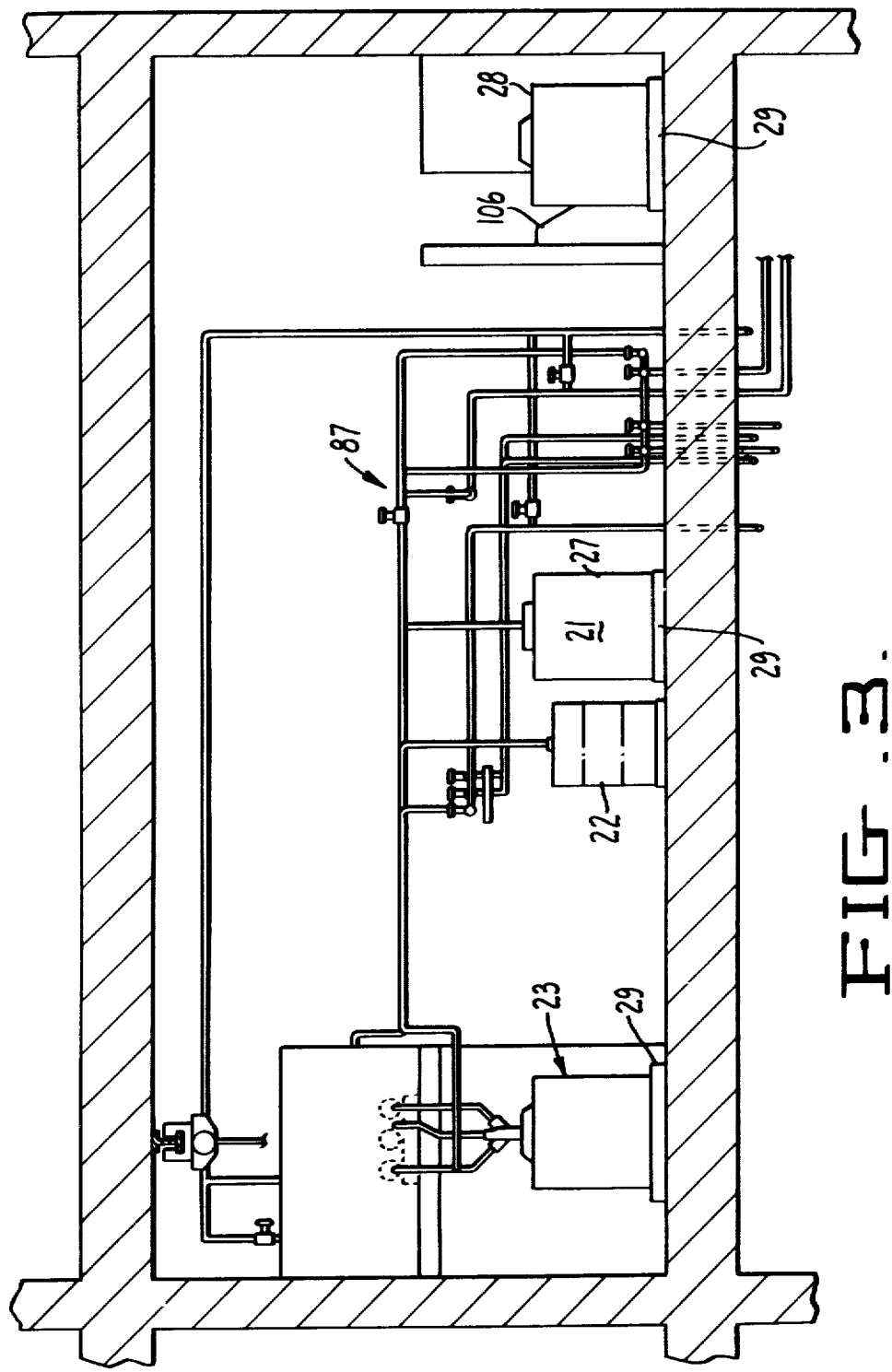
FIG. 3 is an elevational sectional view taken substantially on the plane of line 3—3 of FIG. 2.

While only the preferred forms of the invention have been shown in the drawings, it will be apparent that changes and modifications could be made thereto within the ambit of the invention as defined in the claims.

DESCRIPTION OF THE PREFERRED EMBODIMENTS

Referring to the drawings in detail, it will be seen that the system for disposing of liquids containing radioactive waste material of the present invention provides a supply tank 21 for a setting agent in liquid form, a catalyst tank 22 for a liquid curing agent, a receiving tank 23 adapted to contain solidified radioactive waste material, and pump means 24 adapted for connection to these tanks and to a source of liquid containing radioactive waste material (not shown), the pump means 24 being formed to pump proportioned amounts of the setting and curing agents and radioactive liquid waste into the receiving tank 23 for solidification into a hardened mass. The system also includes mixing means 26 associated with the pump means and formed for intermixing the setting agent with the radioactive liquid waste before delivery to the receiving tank 23.

While the system of the present invention may be utilized to dispose of liquids containing radioactive waste materials from any source, it is particularly suited for use in disposing of waste materials from nuclear reactors and their associated systems. These radioactive wastes often consist of water containing various other materials in solution, in suspension and in various slurry-like forms. High concentration, boric acid solutions are often encountered, as are slurries of spent ion exchange resin beads, filter pre-coat and other particulate materials. Other liquids, such as contaminated oils, etc. may also be present. The system of the present invention is particularly effective in coping with a wide variety of such materials, under a wide variety of temperature and pH conditions, immobilizing and encapsulating these materials in a solidified, hardened mass suitable for disposal by burial.

As a feature of the invention, means is provided for mixing or blending the radioactive waste materials and the liquified setting agent to obtain good dispersion of the setting agent throughout the waste material, and means is provided for adding the curing agent, preferably also in liquid form, at the time the mixture enters the receiving tank in which it is to be solidified. With the use of a water extendable polymer, and particularly the use of a water suspension of urea formaldehyde in finely divided, partially polymerized form, the length of time required for the mixture to solidify is quite short. Accordingly, if the curing agent were to be added prior to the time the mixture is fed into the receiving tank, unwanted solidification could take place before the materials are in their desired location. Such premature solidification could create enormous repair and replacement problems because of the radioactive nature of the materials.

In accordance with the present invention, the curing agent is also a liquid, for ease in mixing and distribution, and is a readily commercially available and inexpensive chemical. The preferred urea formaldehyde setting agent solidifies quickly, in a manner of a few minutes, when a reducing agent is used to promote the curing action. A readily available, inexpensive reducing agent suitable for use in the system of the present invention with urea formaldehyde is sodium bisulfate Means is provided for maintaining a constant concentration of sodium bisulfate maintained by lining chemical feed tank 22 with dark plastic. When the white crystals are added in sufficient quantity to supersaturate the solution of water, the undissolved crystals will remain at the bottom of the tank so that the white crystals contrast with the dark plastic bottom. The operator only needs to add sodium bisulfate in amounts to produce a concentrated or supersaturated solution, with the concentration being limited by the ambient temperature of the surroundings. Thus, operator error is eliminated in measuring the correct proportions of catalysts and water for the proper concentration of solution.

One of the commonly encountered liquid waste materials coming from a nuclear reactor is known as reactor evaporator "bottoms". This is a highly concentrated solution of boric acid and other radioactively contaminated waste materials representing the dregs drained from the evaporators utilized to purify the water used in the reactor. Previous attempts to solidify evaporator bottoms by using Portland cement have been relatively unsuccessful, because Portland cement is relatively intolerant and does not set up well unless the water and other materials mixed therewith are relatively neutral. Accordingly, it has been necessary to buffer, dilute and otherwise extensively treat evaporator bottoms and the like before they can be solidified with Portland cement. Urea formaldehyde, on the other hand, is tolerant to a wide range of pH values and, by utilization of the methods disclosed herein is capable of setting up quickly into a strong, hardened mass well suited to disposal burying.

Another waste material commonly emanating from nuclear reactor systems is radioactively contaminated spent ion exchange resin beads, usually coming from the reactor system in the form of a water slurry. It has been found that encapsulation and solidification of these resin beads into a disposable mass is promoted if the beads are dewatered, and the water is replaced with the liquid mixture of setting agent and water. This permits the setting agent to surround the resin beads in intimate contact, with the solidified material enclosing and guarding against leaching of radioactively contaminated material from the beads.

In the apparatus of the present invention, means is provided for dewatering the slurry of radioactive ion exchange resin beads is dewatered by pumping the slurry into the receiving tank, removing the water component therefrom, replacing the water component with a liquid mixture of setting agent and water, adding the liquid curing agent to the liquid mixture as it enters the receiving tank, and thereafter agitating the contents of the tank until they solidify. This means and procedure are also used with other slurry-like radioactive waste materials, such as filter precoat.

As an important feature of the invention, it is possible to incorporate and encapsulate other non-liquid radioactive waste materials in the solidified mass. Means is provided for positioning such relatively bulky solids as used filter cores, and the like, centrally of the receiving tank so that the entering liquid mixture will surround and encapsulate these objects.

Ordinarily, solid objects such as filter cores have higher specific radioactivity than the liquid waste materials. Likewise, the particulate solids, such as ion exchange resin beads and filter precoat, also usually are at higher radioactivity levels than the liquid waste materials. Where the contents of the receiving tank 23 are simply mixed up into an evenly distributed mass, some of the higher radioactivity solids may occupy positions adjacent to the container walls and create localized hot spots at higher radioactivity emission levels.

The apparatus of the present invention, in one of its forms, suspends the non-liquid radioactive materials in the central area of the container prior to and during addition and solidification of the liquid mixture. The non-liquid materials of higher radioactivity have their radioactive emissions at least partially shielded by the comparatively lower specific activity of the surrounding solidified mass. This, in turn, can significantly reduce the amount of exterior shielding required for the receiving tank and is capable of effecting very significant savings in money and equipment.

In the apparatus of the present invention, the proportions of water, and setting agent, and curing agent are controlled to provide a desired curing time and amount of hardening of the mixture. Control over the length of time necessary to effect solidification and hardening is also provided by means for adding controlled quantities of an inhibiting agent to the liquid mixture. A suitable inhibiting agent for this purpose has found to be ethylenediaminetetraacetic acid, disodium.

Control over the solidification and hardening time is also accomplished by means for controlling the temperature of the liquid mixture, it having been found that higher temperatures promote faster solidification. Accordingly, when the liquid mixture is at elevated temperatures such as cause the mixture to solidify more quickly than desired, a controlled quantity of the inhibiting agent is added to the liquid mixture to slow down the solidification time to a desired period.

Improved mixing of the radioactive liquid waste with the setting agent is accomplished by in-line blending of the two components. This is achieved by means for pumping the setting agent at a controlled rate of flow into a mixing chamber, pumping the radioactive waste liquids into the mixing chamber at a controlled rate of flow proportioned to the rate of flow of the setting agent, admixing and blending the liquid waste and setting agent in the mixing chamber, delivering the mixed liquid mixture from the mixing chamber to the receiving tank 23, and pumping the liquid curing agent into the receiving tank with the liquid mixture. The material in the receiving tank solidifies to a desired hardness, shielding the filled receiving tank against unwanted radioactive emission, and the shielded receiving tank is then transportable to a disposal site.

In the transporting of radioactive materials, certain standards have been set up by governmental and other authorities to guard against overexposure to radioactivity of persons in the vicinity. One such standard is known as "LSA", which means Low Specific Activity, and specifies the maximum radioactivity which can emanate from unit volumes and areas of the material to be shipped. As a feature of the invention, the present apparatus makes it possible to obtain precise control over the LSA levels of the solidified mass. For this purpose, means is provided for adding non-radioactive filler materials, such as pumping clays or mud, are added to the liquid mixture and mixing same therewith in sufficient quantities to maintain the desired LSA quantities at all times. Means is provided for monitoring of the LSA quantities downstream of the mixing area, and the means for addition of the filler materials is controllable in accordance with the monitor readings. Where the prescribed LSA levels are held, the resulting mass will not have to be enclosed in a type B package for transportation, with a consequent net saving in weight to be transported.

In FIG. 1 of the drawings, a preferred embodiment of the apparatus utilized in the system of the present invention is illustrated in a typical installation accessible to a nuclear reactor system. The apparatus here includes the supply tank 21, catalyst tank 22, receiving tank 23 and pump means 24 adapted for connection to the nuclear reactor system to receive therefrom the liquids containing radioactive waste material which are to be solidified for subsequent disposal.

In accordance with the invention, a single type of tank, also called a waste liner, serves in several capacities. The liquified setting agent is transported to the site in these tanks. The tanks are then used to provide the supply tank 21, and when emptied, provide the receiving tank 23. When the receiving tank 23 has been filled and the contained mass solidified, the tank then becomes a container for the mass during the transportation and disposal phases.

As here shown, the waste liners 27 are placed within radioactive shields, such as lead casks 28 at the radioactive waste material receiving station. The waste liners 27 are retained in the lead casks during subsequent operations, including transportation to the disposal site, and then are removed from the casks 28 for burial.

The incoming filled waste liners are very heavy, and this weight is increased by the weight of the lead casks 28. Necessary horizontal movement of the filled liners 27 and the casks 28 from place to place in both the storage and process areas is accomplished by the use of air pallets. This method of materials movement, in effect, "floats" the liners and casks on a friction-eliminating thin film or cushion of air. The air caster pallet is self-stabilizing, and safety is implicit in this design because the floatation film never exceeds a few thousands of an inch. The horizontal force required to move a 30 thousand pound cask is less than 40 pounds, enabling accurate and safe placement of even the heaviest casks by only one or two men. Also, in the unlikely event of spills of radioactive material, the air pallet is usually much more easily decontaminated than would be wheeled vehicles capable of moving and transporting the lead transportation casks.

As shown in FIG. 1 of the drawings, a reserve supply tank 21a may be set aside in a convenient storage area and subsequently moved by an air pallet 29 to the desired position for connection to the pumping system 24. When this tank has been emptied, it is inserted into a lead cask 28 and moved into position to receive the various materials from the pumping means. From this position, the filled liner and cask are moved to an adjacent mixing station, when desired, and the mass is allowed to solidify. The cask and enclosed liner containing the solidified material are then moved to a removal station where the cask can be picked up by a hoist 31 and deposited on a suitable transport unit, such as truck trailer 32. The loaded cask 28 is then moved into the interior of the transportation unit on a similar air pallet 29, which serves also to remove the loaded cask when it reaches the disposal site. At this location, the waste liner filled with the solidified radioactive waste material is removed from the cask and buried or otherwise disposed of in the conventional manner. With this system of moving it is practical to utilize comparatively large tanks, say of about 50 cu. ft. capacity. These tanks are here shown as being cylindrical in form standing on end.

In accordance with the present invention, the pump means includes individual positive displacement pumps for the setting agent, curing agent and radioactive liquid waste, with each of these pumps being formed for varying the quantity being pumped in accordance with the speed at which the pump is driven. Preferably, these pumps are of the progressive cavity rotary type, with each pump equipped with its individual electric drive motor so that controlling the speed of the drive motor will accurately control the output of the pump.

Figure 14:
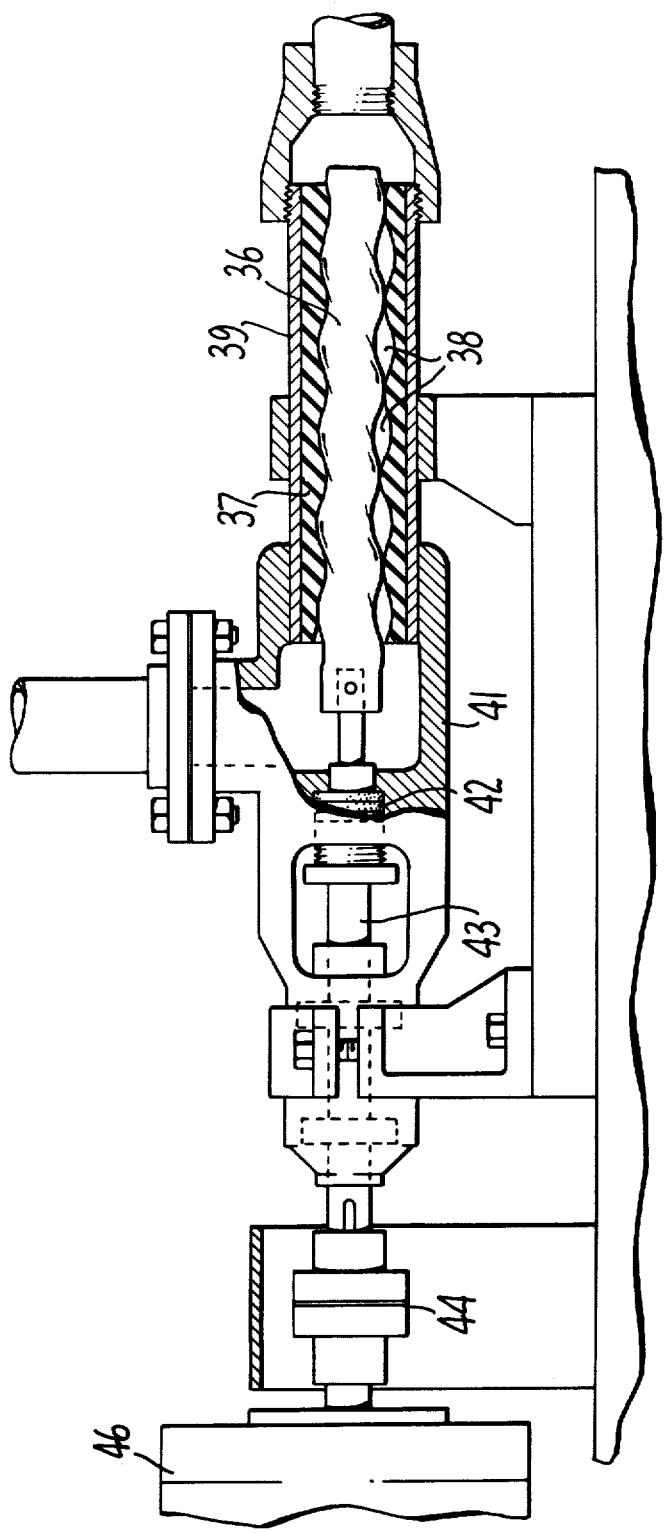
FIG. 14 is a side elevational view of a progressive cavity, positive displacement pump constructed in accordance with the present invention, with portions thereof being broken away and shown in section for clarity.

It has been found that progressing cavity pumps of the type illustrated in FIG. 14 of the drawings are particularly suited for use in the system of the present invention. As shown in FIG. 14, these pumps include an elongated helical rotor 36 rotating in a stator 37, with the rotor and stator being formed so that a series of cavities 38 are defined therebetween and move from one end of the pump assembly to the other to force the material being pumped therethrough. When the pump is not in operation, flow therethrough is sealed off, and when the pump is operated in a reverse direction, the flow simply reverses with equal efficiency.

As illustrated in FIG. 14, the rotor 37 is contained within a sleeve member 39 supported in a housing 41, with the rotor being driven through a conventional packing gland 42 by a drive shaft 43 and coupling 44 from an electric motor 46.

The pump of FIG. 14 has a wide capability for pumping various highly corrosive liquids and slurries containing a variety of particles of different size, hardness, abrasiveness, etc. These pumps are also capable of operating efficiently at comparatively low pressures, making it possible to keep the pressures within the pumping system to a low order, say about 15 pounds per square inch, again greatly reducing the danger of accidental ruptures and spills.

Figure 5:
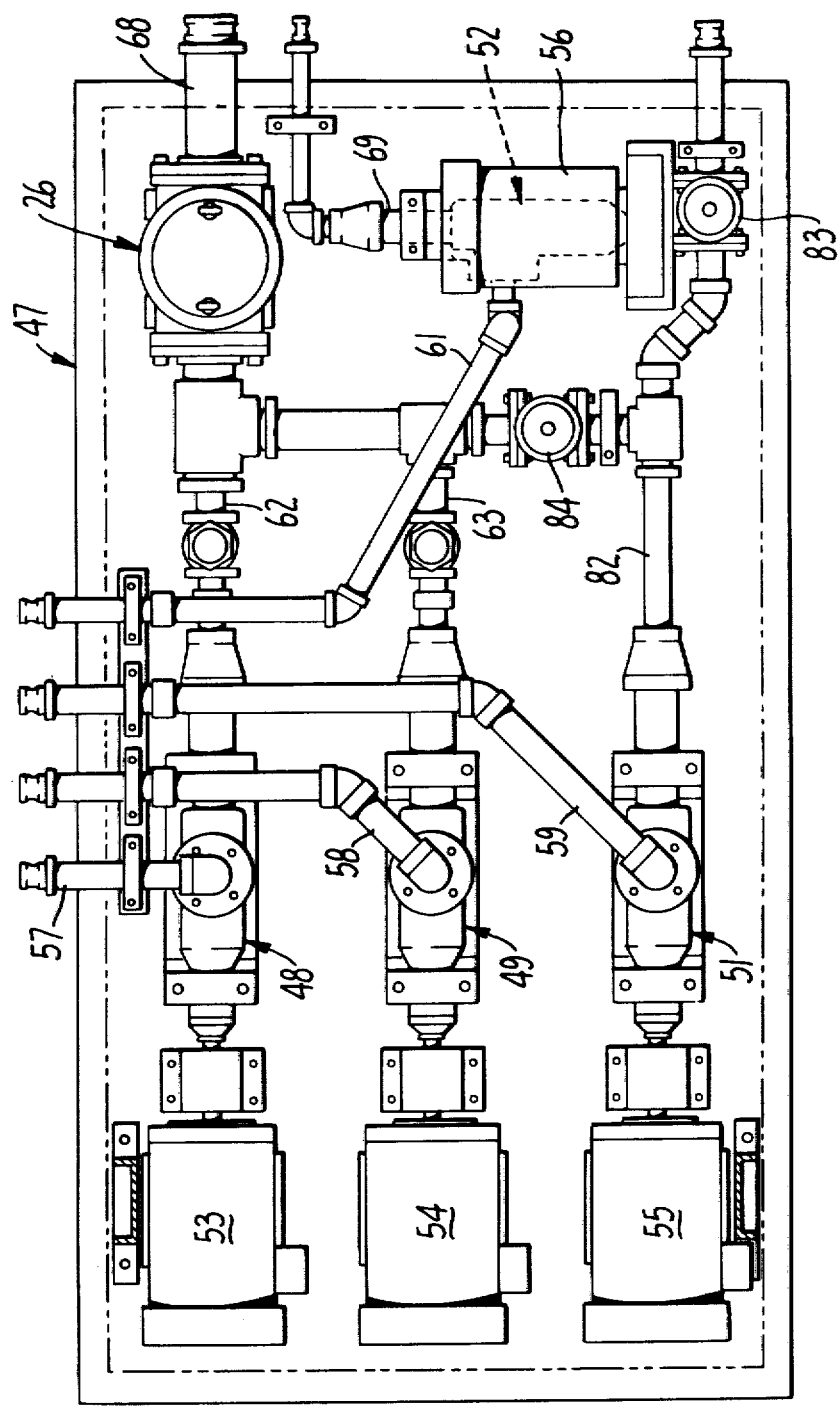
FIG. 5 is a plan view on an enlarged scale of a typical pumping and mixing unit forming a part of the system of the present invention.
Figure 6:
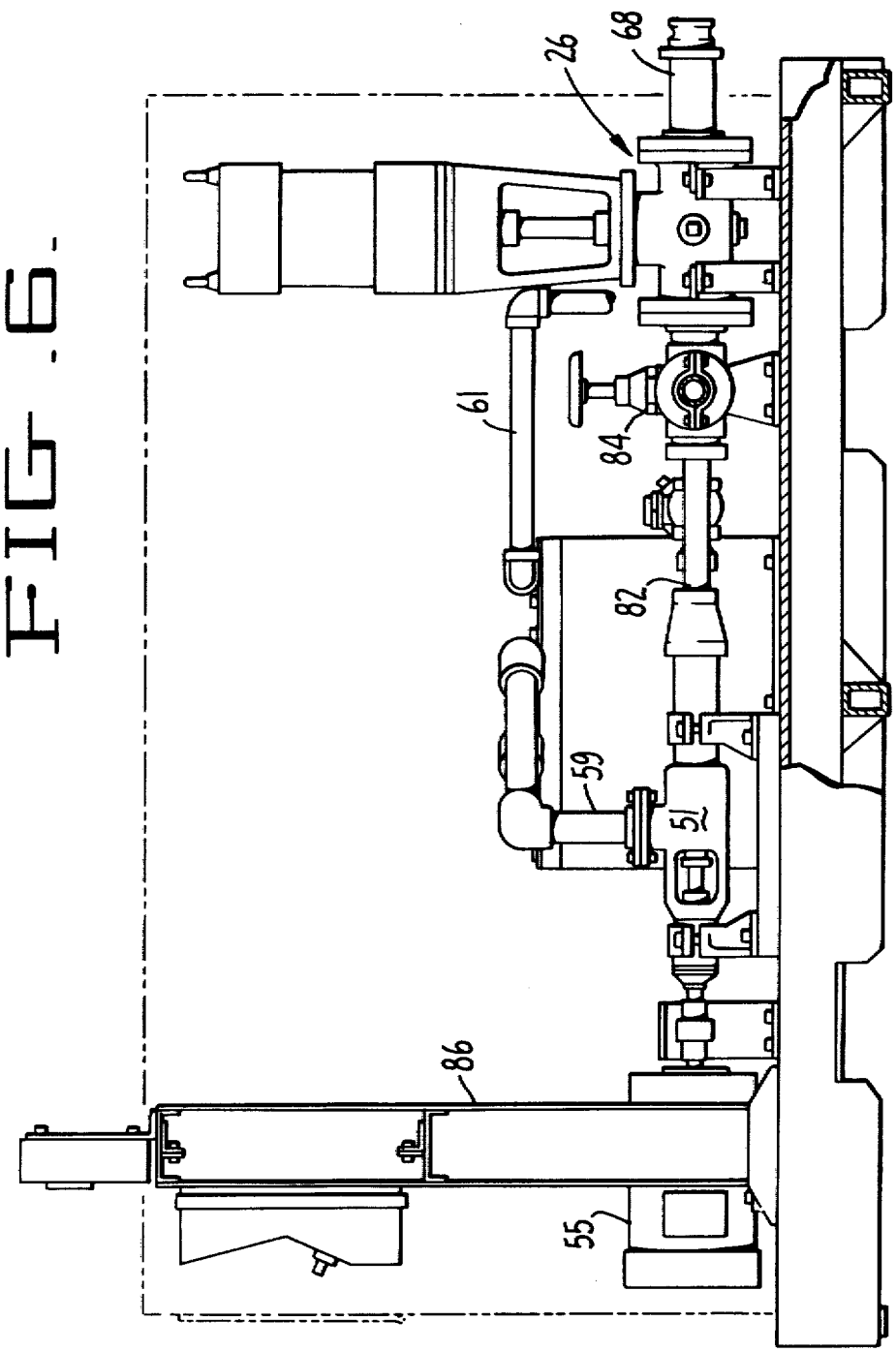
FIG. 6 is a side elevational view of the unit of FIG. 5.
Figure 7:
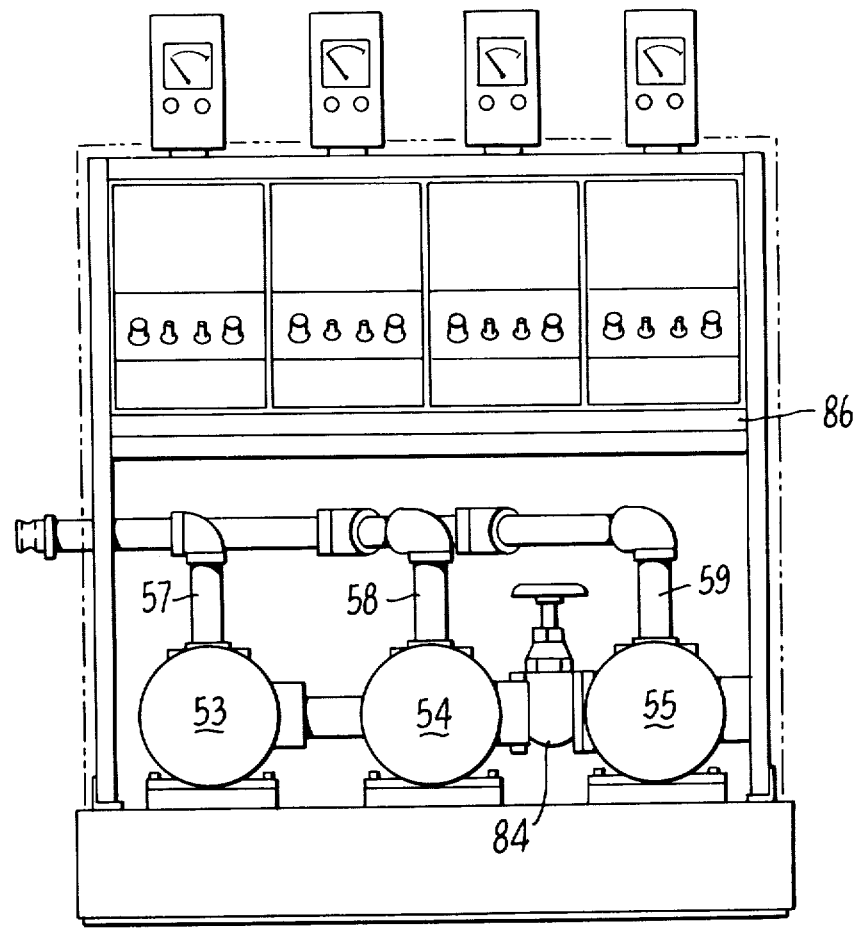
FIG. 7 is an end elevational view of the unit of FIG. 5.

Preferably, the positive displacement pumps are mounted together in a pump unit as illustrated in FIGS. 5 through 7 of the drawings. As there shown, the various components are mounted on a platform 47, and include a radioactive waste pump 48, a setting agent pump 49, a dewatering pump 51 and a curing agent pump 52. Each of these pumps is driven by its own electric motor 53, 54, 55, and 56, respectively. Suitable manifolds are provided for interconnecting the pumps in the manner to be described.

In the pumping unit illustrated in FIGS. 5 through 7 of the drawings, the inlet pipe 57 for pump 48 is adapted for connection to a source of liquid containing radioactive waste material, inlet pipe 58 to pump 49 is adapted for connection to the setting agent supply tank 21, pipe 59 leading to pump 51 is adapted for connection to a source of slurry-like radioactive waste material, and the inlet pipe 61 to pump 52 is adapted for connection to the catalyst tank 22.

Output pipe 62 of pump 48, and output pipe 63 of pump 49 are interconnected for combining the liquid waste material to be solidified with the setting agent.

Figure 15:
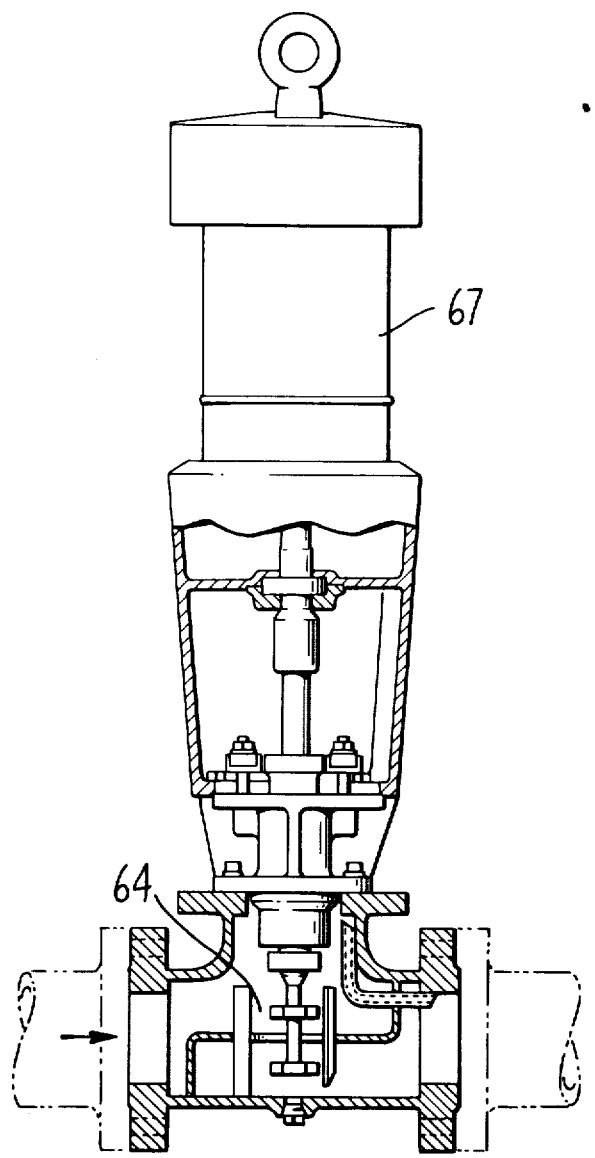
FIG. 15 is a side elevational view of an in-line mixer forming a part of the system of the present invention.

In accordance with the present invention, the liquid radioactive waste material and the setting agent are thoroughly intermixed together by the mixing means 26, which here consists of a powered in-line blender. This blender can best be seen in FIG. 15 of the drawings, and as there shown, includes a mixing chamber 64 where the liquid waste material and liquid setting agent are thoroughly intermixed by whirling impeller type agitators 66 driven by an overhead electric motor 67. The liquid mixture from the mixing means 26 is pumped into an outlet pipe 68 adapted for connection to a line leading to the receiving tank 23.

Curing agent is supplied from pump 52 through outlet pipe 69 adapted for connection to a line leading to the receiving tank 23.

Figure 8:
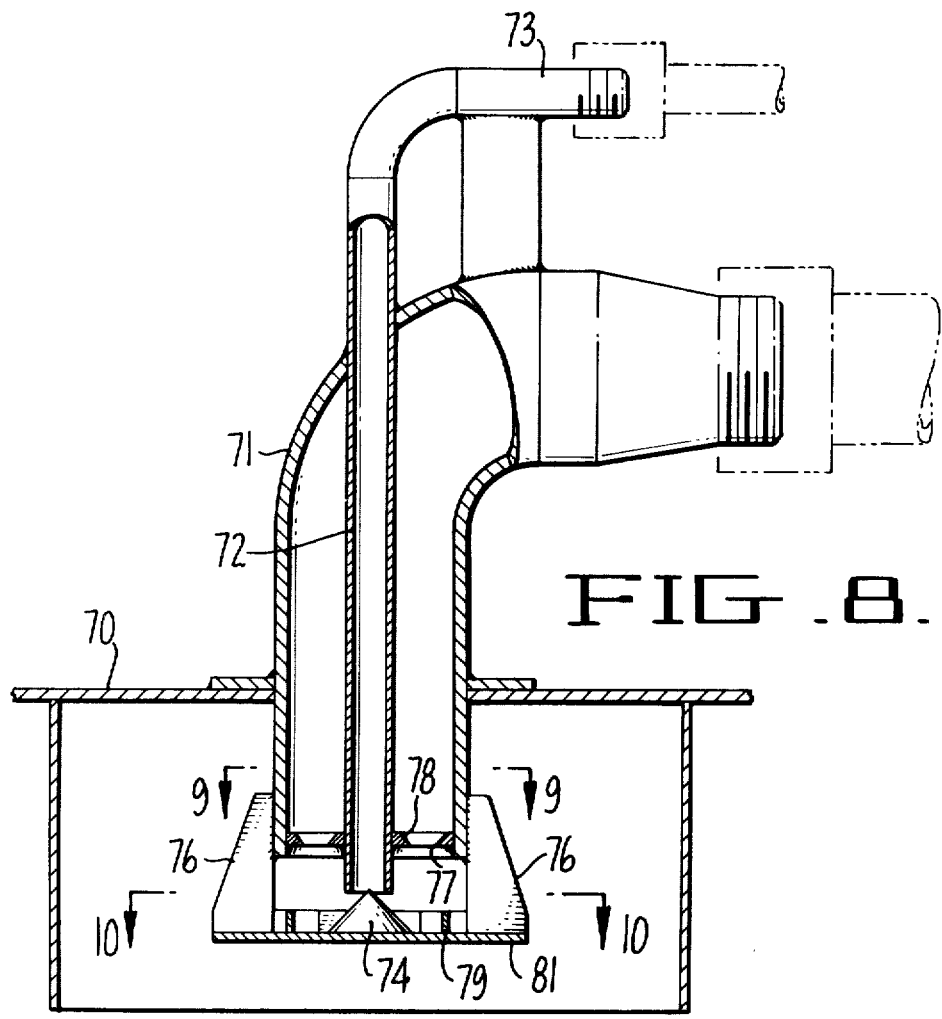
FIG. 8 is a side elevational view on an enlarged scale, partly broken away and shown in section, of a mixing device for adding curing agent forming part of the system of the present invention.
Figure 9:
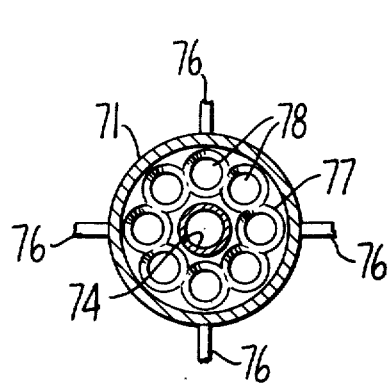
FIG. 9 is a horizontal cross-sectional view taken substantially on the plane of line 9—9 of FIG. 8.
Figure 10:
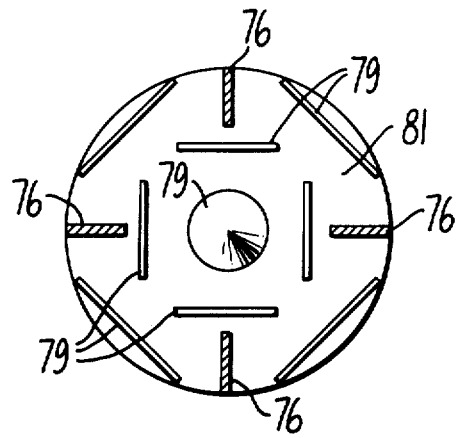
FIG. 10 is a plan sectional view taken substantially on the plane of line 10—10 of FIG. 8.

The curing agent from line 69 can be added to the liquid mixture from line 68 while the latter is in the receiving tank. However, it is preferred to add the liquid curing agent to the liquid mixture just prior to their entry into the receiving tank 23. As may be seen in FIGS. 8 through 10 of the drawings, this is here accomplished by a pre-mixing device which includes a fitting 71 secured to and passing through a plug cover 70 adapted for positioning in the opening into receiving tank 23. Fitting 71 communicates with the mixing means discharge line 68, so that the liquid mixture therefrom will pass through fitting 71 and drop into the receiving tank 23. An injection tube 72 is mounted in co-axial relation in fitting 71 and has an upper portion 73 formed for connection to the outlet from curing agent pump 52.

As the curing agent leaves the lower end of injector tube 72, it strikes a conical deflector 74 carried on bracket 76 in spaced relation below the lower end of fitting 71. The lower end of tube 72 is held in co-axial position in fitting 71 by a spider member 77 formed with a plurality of perforations 78 through which the liquid mixture passes. A series of baffles 79 project upwardly from the bottom plate member 81 of bracket 76 and serve to assist in premixing the curing agent with the liquid mixture as it enters the receiving tank 23.

Pump 51 is particularly adapted for providing the dewatering of spent ion exchange resin bead slurries and the like, as previously described. Because of the ability of the described pumps to produce flow equally well in either direction, the single pump 51 can be utilized to effect the dewatering operation. As here shown, the normal outlet pipe 82 is adapted for connection through a valve 83 to the interior of the receiving tank 23.

In one form of the invention, pump 51 receives slurry through pipe 59 and pumps it through pipe 82 and valve 83 to receiving tank 23. There, the resin beads are allowed to settle, and the pump 51 is reversed to pump the liquid component from the receiving tank and, through suitable connections, to intake pipe 57 of radioactive waste pump 48. When it is desired to add the resin bead slurry to the other liquid radioactive waste materials, valve 83 is closed and valve 84 is opened to communicate pipe 82 with the mixing means 26. A bracket 86 on platform 47 provides a mounting for any desired controls and indicators, see FIGS. 6 and 7.

Figure 4:
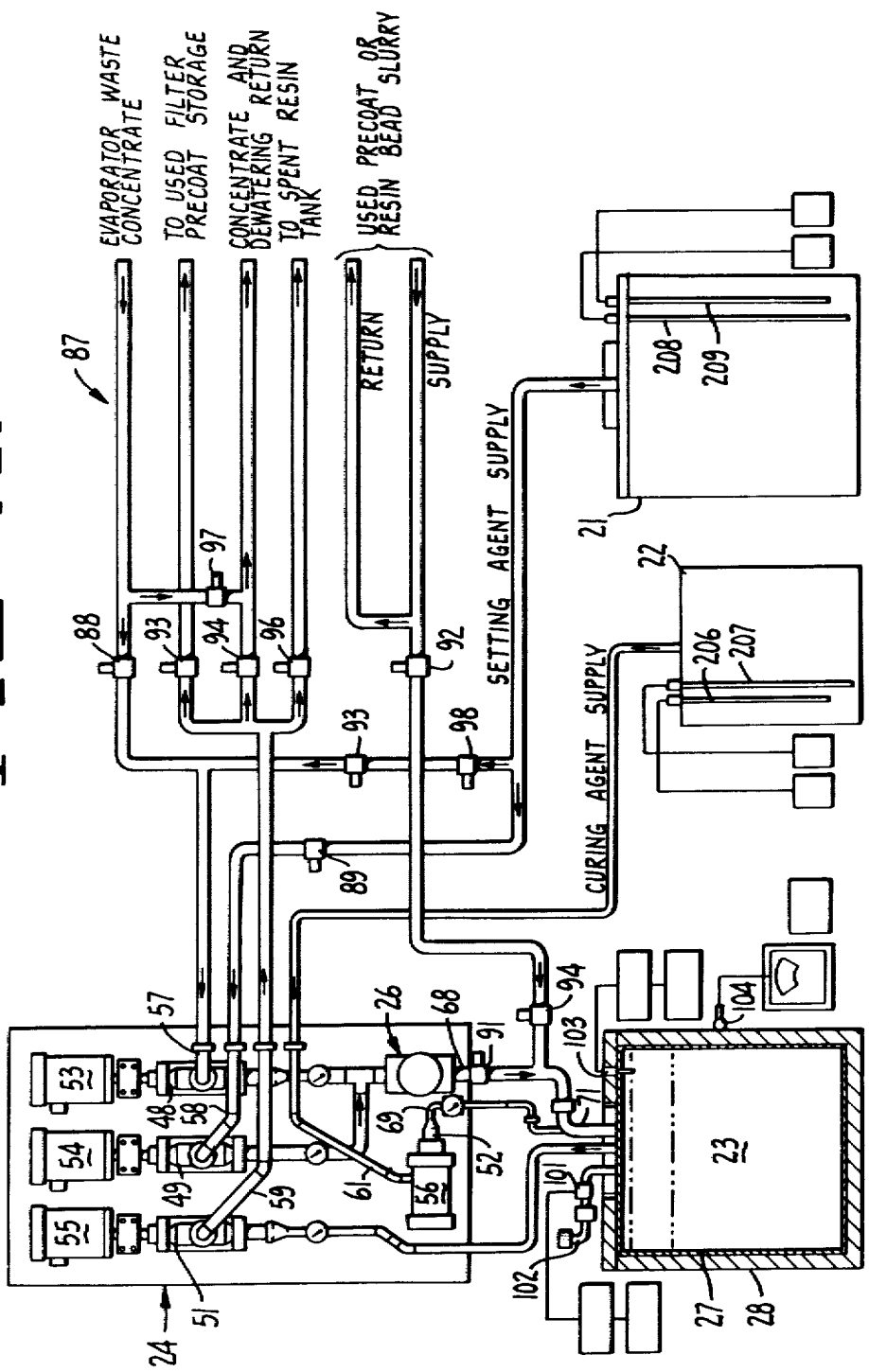
FIG. 4 is a schematic view of a portion of the system of the present invention, illustrating a manifold and control valving means associated therewith.

FIG. 4 of the drawings illustrates the interrelationships of various components in a typical system constructed in accordance with the present invention. As there shown, the pump means 24 is essentially similar to that shown in FIGS. 5 through 7 of the drawings, except that the connection provided by valve 84 has been eliminated. Manifold means 87 interconnects the pumps with the other components of the system in a manner permitting a variety of modes of operation, thus providing flexibility to cope with various types of radioactive waste materials and a variety of situations which may be encountered.

In normal operation, the pump 48 is supplied with evaporator waste concentrate (commonly known as "bottoms") through valve 88. These evaporator bottoms are quite concentrated and consist of aqueous suspensions and solutions of a variety of chemicals. Pump 49 transfers the liquid setting agent from supply tank 21 through a control valve 89, and pumps 48 and 49 discharge into the mixing means 26, from whence the liquid mixture passes through control valve 91 and premix device 71 into receiving tank 23.

When it is desired to add spent resin beads, used filter precoat, and the like, other elements of the manifold means 87 are brought into play. In one mode of operation, control valves 92 and 93 are opened to supply the used precoat or resin bead slurry to the inlet 57 of pump 48, with or without evaporator bottoms, depending upon the opened or closed state of valve 88. In another mode of operation, valves 92 and 94 are opened and the slurry is added to the liquid mixture heading for premix device 71.

The described structure also provides for a mode of dewatering the slurry different thatn that previously described. In this mode, with pumps 48 and 49 inoperative, slurry is supplied through valves 92 and 94 and to receiving tank 23, where the solid components are separated from the liquid components to effect dewatering. The separator water is pumped from tank 23 by pump 51 and back to the used filter precoat or spent resin bead storage tanks (not shown), or back into the evaporator waste concentrate system, depending upon the open or closed state of control valves 93, 94 and 96. A bypass line made operative by control valve 97 makes it possible to keep the evaporator bottoms circulating at all times so as to avoid various problems which may be encountered where the concentrated liquid material allowed to remain stagnant in the pipes.

Entry of the liquid setting agent into the system from supply tank 21 is controlled by valve 89 or, in the alternate, the liquid setting agent may be added directly through valve 98 to the used precoat or resin bead slurry passing directly into receiving tank 23 through valve 94, or may be added through valves 98 and 94 to the liquid mixture passing from mixing means 20 into receiving tank 23. The liquid curing agent is moved by pump 52 from the catalyst tank 22 into the premix device 71 in the manner previously described.

The system component illustrated in FIG. 4 is adapted to be controlled from remote locations to avoid radioactivity hazards. For this purpose, control valves 88-98 are of the solenoid type adapted to be controlled by electrical current supplied from a distant location. Pump motors 53-56 and the motor for the mixing means 26 comprise electric motors and hence are also operable by the supplying of electrical current from remote locations.

As a feature of the invention, safety interlocks are provided for avoiding dangerous spills of radioactive material and suitable radioactivity counters and liquid presence sensors are incorporated into the system to provide constand information from which the operator can control the opening and closing of valves 88-89 and the speed of rotation of the pump motors 53-56 and the motor for the mixing means 26 to provide the desired proportions of the various materials entering the receiving tank 23.

Typically, and as here shown, a liquid presence sensor 101 is incorporated in the overflow and vent pipe 102 of receiving tank 23. A liquid level sensor 103 is positioned in receiving tank 23 to let the operator know when the tank is approaching the desired filled state. One or more radioactivity counters 104 are positioned around the exterior of the cask 28 to provide information as to cask surface radiation.

Liquid level detectors 206 and 207 are positioned in catalyst tank 22 to inform the operator when the supply is getting low and when the supply has been exhausted. Similar liquid level sensors 208 and 209 are inserted into setting agent supply tank 21 to provide similar information.

Automatic safety interlocks are conveniently provided with the described system by having sensors 101, 103, 207 and 208 shut off power to the pump and mixer motors when receiving tank 23 is full or overflows, or when tanks 21 or 22 are empty. Of course, where radioactive hazards are comparatively low, the operation of the control valves 88-98, the speed of the individual pump motors 53-56 and the speed of the motor for the mixing means 26 may be manually controlled. In such event, the described safety interlocks are still valuable in avoiding accidental spills.

Figure 11:
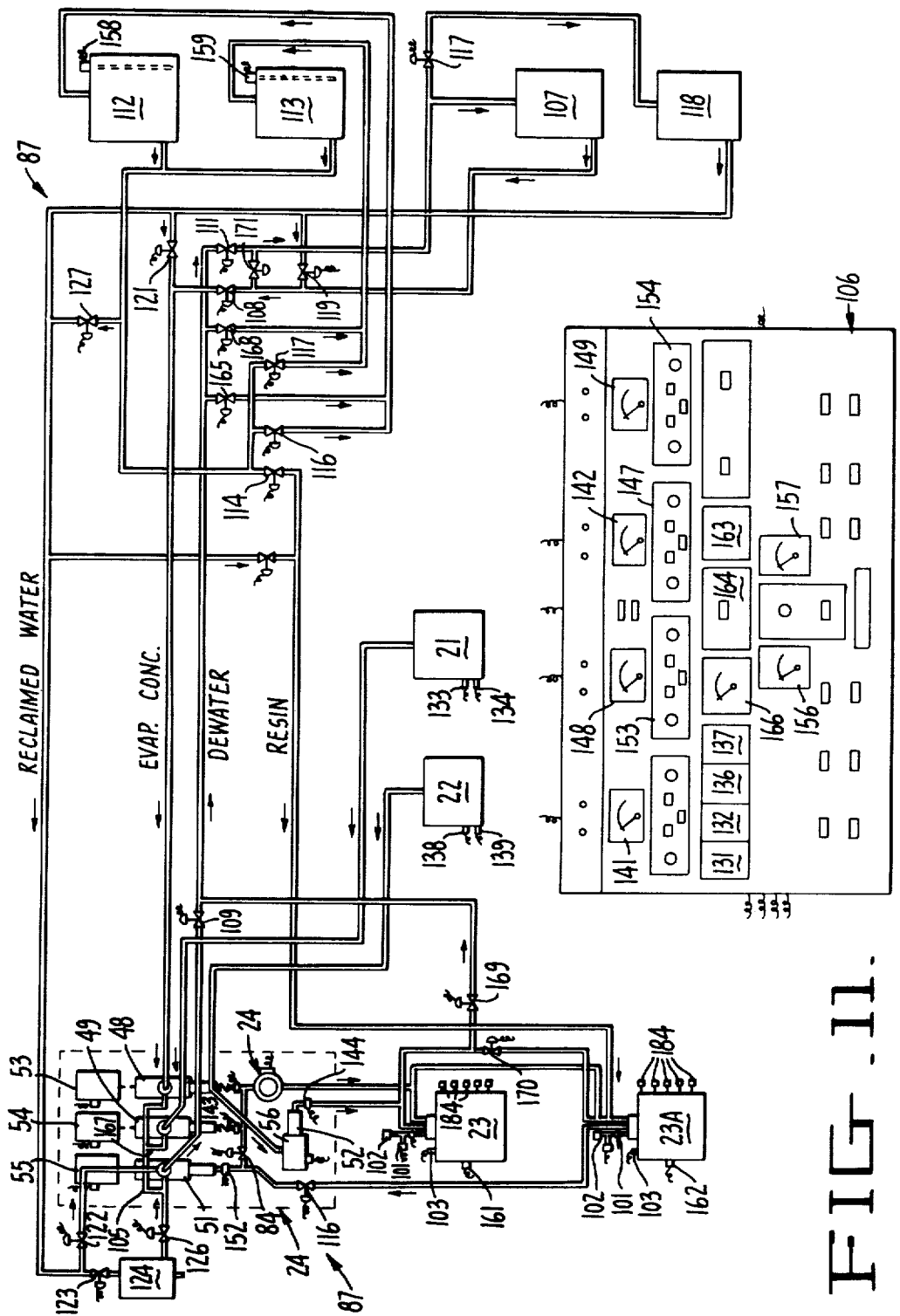
FIG. 11 is a schematic view of a typical system constructed in accordance with the present invention and illustrating control means and a control panel therefor.

FIG. 11 of the drawings illustrates a modified form of the system of the present invention and its relationship to a typical control panel 106. As there shown, the pumping system 24 is again generally similar to the unit illustrated in FIGS. 5 through 7 of the drawings, with certain additional connections for the purposes of this system. The additions and modifications over the system of FIG. 4 provide additional capabilities and modes of operation.

In the system of FIG. 11, the liquid evaporator concentrates or bottoms are held in a storage tank 107 and are circulated through control valves 108 and 109 to pump 48 from whence the concentrates pass either to the mixing means 24 or through a bypass line 105 to pump 51. The discharge of pump 51 passes through control valves 109 and 111 back to the evaporator concentrate storage tank 107, thus creating a circulating system.

Spent resin and used precoat slurries are stored in tanks 112 and 113, respectively. These slurries are supplied through control valve 114 to discharge into a receiving tank 23. Control valves 116 and 117 provide for recirculation of the slurries back through the tanks 112 and 113. In the dewatering operation, the system of FIG. 11 provides a separate receiving tank 23A in which the dewatering is conveniently accomplished. The resin slurry flows into tank 23A in the manner described above, and the separated water component is circulated by pump 51 through a control valve 116, the control valves 109 and 111 and control valve 117 to a reclaimed water storage tank 118. From tank 118, the reclaimed water is supplied to desired portions of the system through a control valve 119 communicating with control valve 109, a control valve 121 communicating with pump 48, control valve 122 communicating with pump 51 and control valve 123 adapted to provide reclaimed water to a pump lubrication tank 124, from whence pump lubrication may be supplied to the system through a control valve 126. A bypass control valve 127 makes it possible to add slurries from tanks 112 and 113 to the reclaimed water system.

In the control panel illustrated in FIG. 11 of the drawings, indicators 131 and 132 signal the operator when the setting agent supply tank 21 is low or empty as detected by sensors 133 and 134, respectively. Similar indicators 136 and 137 inform the operator when catalyst supply tank 22 is low or empty, as detected by sensors 138 and 139. Meters 141 and 142 indicate the rate of flow of the setting agent and curing agent respectively into the receiving tank 23, as detected by flow indicators 143 on the output of pump 49 and 144 on the output of pump 52. Power supply controls 146 and 147 are manipulated in response to the readings being received from flow indicators 143 and 144 to provide the desired proportions of setting agent and curing agent at all times during the operating cycle.

Meters 148 and 149 likewise indicate the rate of flow of the evaporator concentrate and the reclaimed water as ascertained by rate of flow indicators 151 on the output of pump 48 and 152 on the input of pump 51. Power supply controls 153 and 154 are provided for adjusting the rates of flow in response to the readings of meters 148 and 149.

Liquid indicators 156 and 157 are provided to show the quantities of slurry in the tanks 112 and 113, as determined by liquid level sensors 158 and 159 respectively. Monitoring of the radioactiviy levels is here provided by surface radiation monitors 161 and 162 mounted on the lead casks surrounding receiving tanks 23 and 23A. These monitors actuate a visible indicator 163 when surface radiation limits are exceeded so control 164 can be actuated to close the various valves and cut off power to pump motors, thus providing an emergency stop. Continuous monitoring of radiation levels at the cask surfaces is provided by the detectors 161 and 162 and the radiation levels detected are indicated on meter 166.

Provision is made for additional versatility of the system by additional control valves 167, 168, 169, 170 and 171 which permit interconnections between the various systems to accomplish other alternate modes of operation. Provision is made on control panel 106 for such additional controls as may be desired. As an example, another capability of the system of FIG. 11 is to be able to flush out the manifold means 87 to prevent hardening of any of the various materials, especially the setting agent, when the system is inactive. This is accomplished by pumping reclaimed water from tank 118, or fresh water from an outside source, through control valve 109, bypass line 105 and branch 165 to pump 49. From here, the flush water passes through mixing means 143 and on into the receiving tanks 23 and 23A.

Because of the water takeup propensities of the materials used, this flush water is simply mixed with the liquid mixture in the receiving tanks and participates in the solidification.

Figure 12:
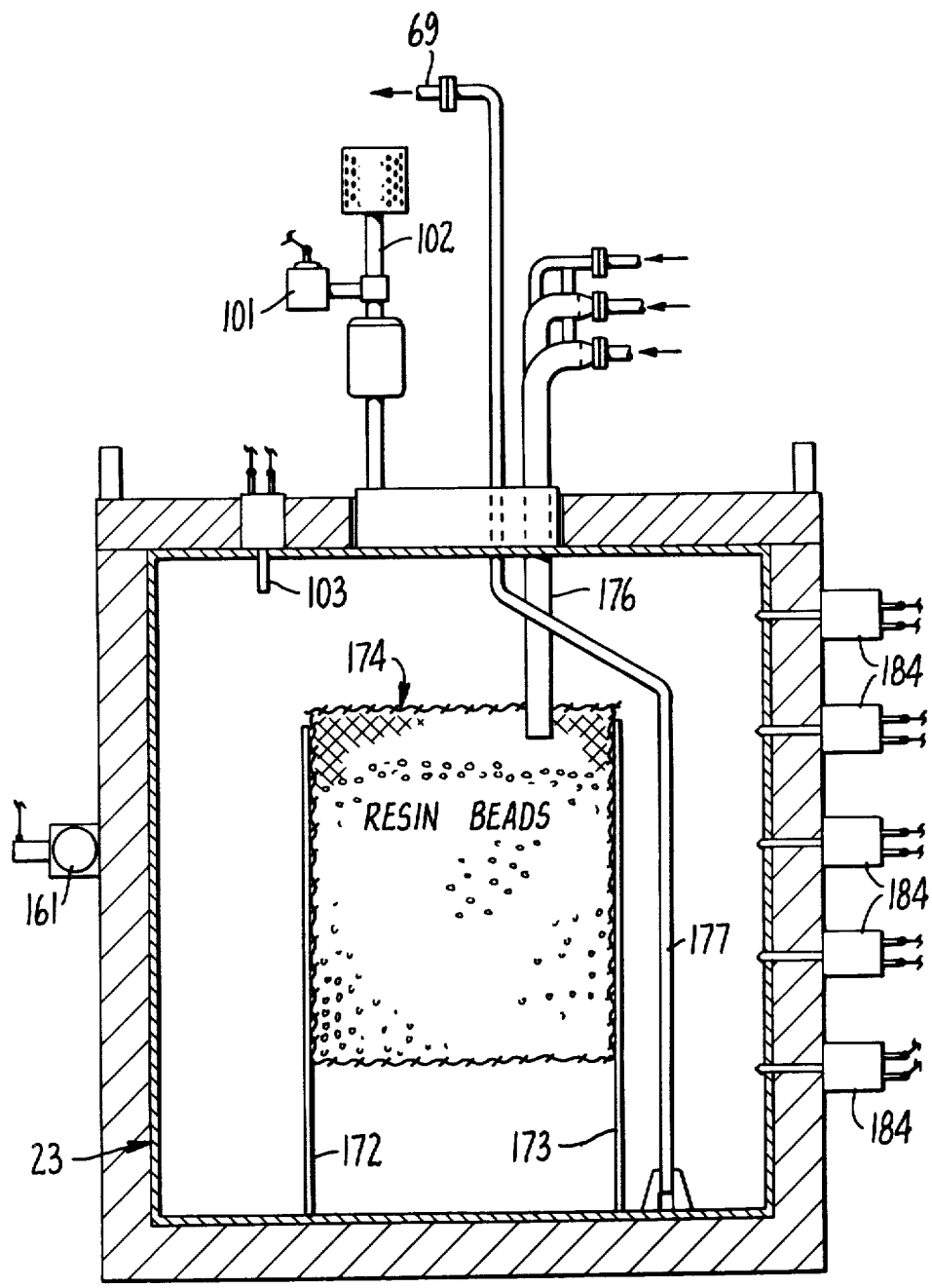
FIG. 12 is a vertical cross-sectional view illustrating a receiving tank and device for concentrating high radioactivity material at the central area, made in accordance with the present invention.

As a feature of the present invention, means is provided for positioning solid materials of relatively high radioactivity in the central portion of the receiving tank 27 in position to be encapsulated and shielded by the lower radioactivity liquid mixture pumped into the receiving tank. As shown in FIG. 12 of the drawing, this means includes standards 172 and 173 strong enough to retain the high radioactivity solids in position during filling of the receiving tank 23 with the liquid mixture. Where the high radioactivity solids are dewatered resin beads or the like, a perforated container 174 is mounted in the central position on the standards 172 and 173. The resin slurry is fed into basket 174 through a tube 176 which may be removed from tank 23 when dewatering is completed, or may be left in the tank to be surrounded and encapsulated by the solidified liquid mixture.

The perforations in basket 174, which may be made of suitable mesh, are small enough to retain the plastic beads while permitting the water component of the slurry to fall to the bottom of tank 23. This water component is removed through pipe 177 by the dewatering pump 51. When the desired quantity of the reclaimed water has been removed from tank 23, the system is operated to pump the liquid mixture of radioactive liquid waste material, setting agent and curing agent into tank 23 where it will surround and encapsulate the resin beads, the mixture being such that it penetrates through basket 174 and solidifies the resin beads therewithin.

Figure 13:
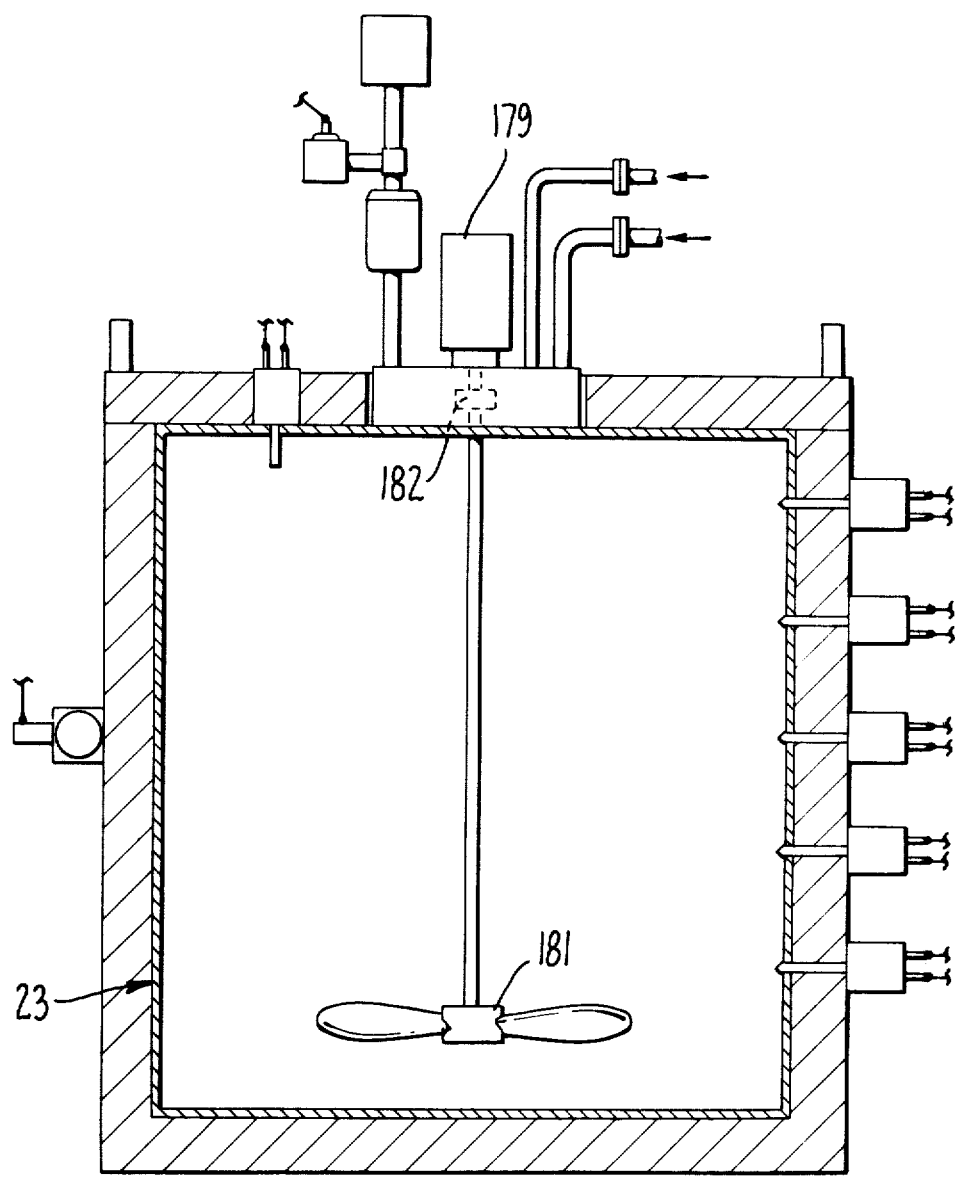
FIG. 13 is a vertical cross-sectional view through a receiving tank and surrounding shield similar to that of FIG. 12, but illustrating a mixing apparatus for agitating the contents of the tank during solidification thereof.

When the system of the present invention is operated in a mode wherein the resin beads, or similar particulate material, is to be distributed evenly throughout the mass, a mixing motor 179 is removably mounted on top of tank 23 in the manner illustrated in FIGS. 1 and 13. The mixing motor 179 drives a beater or agitator assembly 181 to agitate the contents of the tank 23 during addition of the liquid mixture and until the mixture begins to harden and solidify. At this point, the mixing motor 179 is disengaged from the beater 181 by means of a releasable coupling 182, and the beater 181 is left in the solidifying mass.

When it is desired to encapsulate higher radioactive solids such as filter cores 183 in the central area of the solidified mass, a waste liner 27 may be inserted into a lead cask 28 and positioned at a convenient position for loading, such as depicted in the upper right hand corner of FIG. 1. The filter cores 183 or other solid pieces are dropped into place and the shielded waste liner then is moved on an air pallet 29 to position for receiving the liquid mixture from pump means 24. Liquid level sensors 184 are removably mounted through lead cask 28 to detect the liquid level as filling progresses.

From the foregoing it will be seen that the system for disposing of liquid radioactive waste materials of the present invention possesses numerous features of advantage providing for safe and efficient operation in a variety of modes under hazardous and difficult operating conditions, while affording continuous control over the various functions and the resulting solidified mass of radioactive waste in a safe and efficient manner providing various safety interlocks and operations to solidify and encapsulate the various radioactive waste materials in easily disposable form providing effective protection for the surrounding environment.

We claim:

1. A system for disposal of radioactive waste material, comprising
   a supply tank adapted to contain a setting agent in liquid form,
   a catalyst tank adapted to contain a curing agent in liquid form,
   a holding tank for storing liquids containing radioactive waste materials,
   a receiving tank adapted to contain solidified radioactive waste material,
   pump means adapted for connection to said tanks and to a source of liquid containing radioactive waste material,
   said pump means being formed to pump proportioned amounts of said setting agent and curing agent and radioactive liquid waste into said receiving tank,
   mixing means associated with said pumping means and formed for intermixing said setting agent and said radioactive liquid waste before delivery to said receiving tank
   and a lead cask transportation shield formed to enclose said receiving tank and prevent unwanted radioactive emissions during filling and transfer, said lead cask being formed for removal and ultimate disposal of the filled receiving tank at a burial site.

2. A system for fixing combined liquid and particulate radioactive waste materials into a solidified plastic matrix of cured polymer having the radioactive waste distributed throughout, comprising
   a supply tank containing a syrup of an aqueous suspension of partially polymerized particles of urea formaldehyde,
   a catalyst tank containing a liquid curing agent capable of promoting polymerization of said urea formaldehyde,
   pump means connected to said tanks and adapted for connection to a source of a slurry of combined liquid and particulate radioactive waste materials,
   said pump means being formed to pump variably proportionate amounts of said syrup and said slurry of radioactive waste material through a first outlet and to pump variable proportionate amounts of said liquid through a second outlet,
   blending means associated with said pump means and formed for agitating and blending together said syrup and said radioactive waste material before delivery through said outlet,
   mixing means connected to said first and second outlets and formed for intermixing said blend of said syrup of partially polymerized particles of urea formaldehyde and radioactive waste material with said curing agent,
   a receiving tank formed to receive the mixture from said mixing means and to contain same as said polymerization occurs whereby the resulting solidified mass is encapsulated in said receiving tank for environmental contamination free storage.

3. A system as described in claim 2 and wherein said supply tank is formed for use as the said receiving tank when said setting agent has been pumped therefrom.

4. A system as described in claim 2 and wherein said pump means is of the positive displacement type and affords a mixing action on the materials pumped thereby.

5. A system as described in claim 2 and wherein said blending means includes a motor driving impeller for effecting mixing of said syrup and said radioactive waste material prior to delivery to said first outlet.

6. A system as described in claim 2 and wherein said pump means is also adapted for connection to a source of water and is formed to pump proportioned amounts of water therefrom with said mixture of radioactive waste material and syrup and curing agent into said receiving tank.

7. A system as described in claim 2 and wherein said system further comprises flush means formed for pumping additional water through said system and into said receiving tank so as to remove and prevent solidifying of said radioactive waste and said syrup within the system.

8. A system as described in claim 2 and wherein said pump means is also adapted for connection to a source of substantially radioactively inert filler material and is formed to pump a proportioned amount of such filler material into said receiving tank with said radioactive waste and said syrup and said curing agent so as to achieve a desired Low Specific Activity rating for the resulting mass of solidified material, and radioactivity counter means is provided mounted in proximity to said receiving tank for monitoring said Low Specific Activity rating as said receiving tank is filled.

9. A system as described in claim 2 and wherein said mixing means further comprises a mixing device removably mountable on said receiving tank and having a motor driven agitator element extending thereinto for stirring the mixture of radioactive waste and said syrup and said curing agent as the mixture solidifies, said agitator element being detachable from the motor of said mixing device so as to permit removal of the latter from said receiving tank after said mixture has solidified and immobilized said agitator element.

10. A system for disposal of radioactive waste material as described in claim 2 and wherein air pallets are provided for shifting an emptied one of said supply tanks to a suitable position for use of same as said receiving tank and for removing the filled receiving tank to a different location.

11. A system as described in claim 2 and wherein said curing agent supply tank is formed with a dark lining against which undissolved white crystals are readily visible whereby a saturated water solution may be maintained therein by replacing water drawn therefrom and white crystalline curing agent whenever the dark bottom of the curing tank becomes visible.

12. A system as described in claim 2 and wherein said pump means includes individual positive displacement pumps for said syrup and said curing agent and said radioactive waste, each of said pumps being formed for varying the quantity being pumped thereby in accordance with the speed at which it is driven, and drive means connected to said pumps and formed for driving each of said pumps at a desired speed for selectively adjusting the relative proportions of the materials being pumped.

13. A system as described in claim 12 and wherein said pumps comprise progressive cavity rotary pumps.

14. A system as described in claim 13 and wherein said pumps include an elongated helical rotor cooperating with a stator having an elongated helical cavity to provide said positive displacement pumping.

15. A system as described in claim 14 and wherein said rotor is formed of stainless steel and said stator is formed of a flexibly resilient material.

16. A system as described in claim 15 and wherein said stator is formed of a butyl synthetic rubber.

17. A system as described in claim 12 and wherein said drive means includes speed control means formed for regulating the speed at which each of said pumps is driven, said speed control means being operable while said pumps are being driven to vary independently the speed of each pump so as to provide selective regulation of the proportions of the materials pumped by said pump means.

18. A system as described in claim 2 and wherein a radioactivity emission shield is removably mounted to surround said receiving tank.

19. A system as described in claim 18 and wherein said receiving tank is of cylindrical form standing on end and is of about fifty cubic feet capacity.

20. A system as described in claim 19 and wherein said shield is a lead cask of cylindrical form standing on end and is formed for shielding the surrounding environment during transporting of the filled receiving tank.

21. A system as described in claim 2 and wherein said pump means is also formed to pump a mixture of liquid and particulate radioactive waste material from said source directly into said receiving tank before pumping said blemd of urea formaldehyde and radioactive waste material into said receiving tank, said receiving tank being formed for separating the liquid material from the particulate material and retaining said particulate material in said receiving tank, said pumping means being formed for selectively pumping a desired quantity of said liquid material from said receiving tank prior to pumping said mixture from said mixing means into said tank, and agitating means is provided on said receiving tank for agitating and intermixing the retained particulate radioactive waste material with the mixture entering the receiving tank from said mixing means.

22. A system as described in claim 21 and wherein said solid component is substantially spent ion exchange resin beads and said liquid component is substantially water.

23. A system as described in claim 21 and wherein said pump means includes individual positive displacement pumps for said radioactive waste and said syrup and said curing agent and said water, each of said pumps being formed for varying the quantity being pumped thereby in accordance with the speed at which it is driven, and drive means for said pumps formed for driving each of said pumps at a desired speed for selectively adjusting the relative proportions of the materials being pumped for thereby controlling the average radioactivity level of the contents of said receiving tank.

24. A system as described in claim 2 and which further comprises holding means for confining material of relatively higher radioactivity in the central portion of said receiving tank in position to be surrounded by said mixture of said syrup and curing agent and radioactive waste pumped into the receiving tank.

25. A system as described in claim 24 and wherein said holding means comprises a separate holding receptacle smaller than said receiving tank, and support means in said receiving tank formed for supporting said holding receptacle centrally of said receiving tank and in spaced relation thereto whereby liquid solidifiable materials filling said receiving tank will surround and shield said holding receptacle.

26. In a system for disposing of a liquid containing radioactive waste material having supply tanks for setting and curing agents and a receiving tank, pump means comprising a setting agent supply pump having an inlet conduit adapted for operative connection to the setting agent supply tank, a radioactive waste pump having an inlet conduit adapted for operative connection to a source of the liquid containing radioactive waste material, a curing agent supply pump having an inlet conduit adapted for operative connection to the curing agent supply tank, manifold means connected to receive materials pumped by said pumps and adapted for connection to the receiving tank, and mixing means interposed in said manifold means and formed for intermixing the materials received from said pumps and discharging the mixture into the receiving tank, with the radioactive waste and setting agent being intermixed together at a first station and then mixed with the curing agent at a second station downstream of said first station.

27. In a system as described in claim 25, pump means as set forth therein and wherein each of said pumps is of a positive displacement type in which delivery from the pump to said manifold means is a function of the speed at which the pump is driven.

28. In a system as described in claim 25, pump means as set forth therein and wherein a dewatering pump is adapted for operative connection at one end to a source of slurry of water and particles of radioactive water treatment materials and to the receiving tank at the other end, and said dewatering pump is reversible for pumping the slurry into the receiving tank for separation out of the water and for dewatering by pumping such water out of the receiving tank.

29. In a system as described in claim 25 and wherein a control system is connected to said tanks and said manifold means and is formed for operating the several elements of said system in desired sequence from a remote location.

30. In a system as described in claim 25, pump means as set forth therein and wherein drive means is formed to drive said pumps at individually remotely controllable speeds for varying the relative proportions of the materials pumped into said manifold means whereby the specific activity of the resulting mixture is controlled to predetermined levels.

31. In a system as described in claim 30, pump means as set forth therein and wherein each of said pumps is of a rotary positive displacement type providing a relatively pulsation free discharge and in which the rate of delivery is a function of its speed of rotation.

32. In a system as described in claim 31, pump means as set forth therein and wherein each of said pumps is of a helical progressive cavity type capable of pumping a wide range of materials in liquid and slurry forms.

33. In a system as described in claim 32, pump means as set forth therein and wherein said radioactive waste pump has a resilient stator and a non-resilient rotor.

34. In a system as described in claim 33, pump means as set forth therein and wherein said resilient stator is formed of a butyl synthetic rubber, and said rotor is formed of stainless steel.

35. In a system as described in claim 30, pump means as set forth therein and wherein each of said pumps is driven by a separate motor.

36. In a system as described in claim 25, pump means as set forth therein and wherein said pumps are interconnected and a valve system is provided for selectively connecting different pumps to said tanks and source of liquid containing radioactive waste material so as to provide alternate modes of operation.

37. In a system as described in claim 36 and wherein remote control means is provided for selectively operating said valve system in a desired sequence from a position remote from said system.

38. In a system as described in claim 37 and wherein said remote control means includes liquid presence sensors connected to said tanks, and said remote control means is responsive to said sensors for preventing overfilling and accidental spill.

39. In a system as described in claim 38 and wherein said remote control means is formed to shut down said system in response to detection of an anomalous condition by said sensors.

* * * * *